US009413226B1

(12) United States Patent
Lin

(10) Patent No.: US 9,413,226 B1
(45) Date of Patent: Aug. 9, 2016

(54) POWER FACTOR CORRECTION SYSTEM

(71) Applicant: Fuxiang Lin, Lidcombe (AU)

(72) Inventor: Fuxiang Lin, Lidcombe (AU)

(*) Notice: Subject to any disclaimer, the term of this patent is extended or adjusted under 35 U.S.C. 154(b) by 0 days.

(21) Appl. No.: 14/722,171

(22) Filed: May 27, 2015

(51) Int. Cl.
*H02M 5/42* (2006.01)
*H02M 1/42* (2007.01)
*H02M 3/335* (2006.01)

(52) U.S. Cl.
CPC ........ *H02M 1/4258* (2013.01); *H02M 3/33538* (2013.01)

(58) Field of Classification Search
CPC ............... Y02B 70/126; H02M 3/156; H02M 3/33569; H02M 3/338; H02M 3/335; H02M 3/33507; H02M 7/1557; G05F 1/33
USPC ............. 323/207, 222; 363/16, 18, 20, 21.04, 363/21.12, 88, 89, 90
See application file for complete search history.

(56) References Cited

U.S. PATENT DOCUMENTS

| | | | |
|---|---|---|---|
| 8,368,364 B2 * | 2/2013 | Asuke | H02M 1/34 323/222 |
| 2007/0263417 A1 * | 11/2007 | Lin | H02M 1/34 363/21.12 |
| 2014/0071716 A1 * | 3/2014 | Lin | H02M 1/4258 363/21.04 |

* cited by examiner

*Primary Examiner* — Nguyen Tran

(57) ABSTRACT

A power factor correction system is comprised of a inductor and a forward transformer. The inductor is connected to the first winding of the forward transformer. In series. The inductor is used to boost the input voltage to the design level and correct input current waveform. The forward transformer is used to prevent the large reversed current through rectifier diode and the switch. The second winding of the forward transformer is used to receive the energy through the first winding of the forward transformer to correct input current waveformer and the third winding is used to reduce the switch voltage stress.

6 Claims, 2 Drawing Sheets

POWER FACTOR CORRECTION SYSTEM

FIELD OF THE INVENTION

The present invention relates to AC to DC converters, and more particularly, to a high power factor correction with improved efficiency.

BACKGROUND

AC-to-DC converters are used to convert an AC input voltage, such as a fully-rectified AC line voltage from a power outlet, to a regulated DC output voltage at a desired output voltage level. To meet regulatory requirements, AC to DC convertes are designed with power factor correction (PFC) to achieve a high power factor while reducing total harmonic distortion (THD). Various topologies have been proposed for AC-To-DC converters incorporating power factor correction (PFC). For example, a conventional boost topology useds a bridge rectifier (also referred to as a diode bridge) to rectify the AC input voltage to DC followed by a boost converter functioning as an active PFC circuit FIG. 1. The boost converter attempts to maintain a constant DC bus voltage on its output while drawing a current that always in phase with and at the same frequency as the line voltage. However, the boost converter suffers significant power loss due to rectified diode and the boost switch power loss. One method uses a critical boundary boost power factor correction, in this design, the inductor current is allowed to completely go to zero before the next switching cycle of the mosfet is initiated and all diode losses are due to forward conduction. But it is difficult to design a controller with stable operation and fast transient response for both modes, the boost converter will be unstable between DCM and CCM. The present invention overcomes the above problems by using a forward transformer to prevent the rectifier reversed conduction loss and mosfet turn on loss.

SUMMARY

In one embodiment, the present invention provides a power factor correction system comprising two inductors, a forward transformer, four diodes, three capacitors, a switch and a control unit. The power factor correction system is coupled in series to a rectifier bridge. The rectifier bridge receives an input current from an AC power source and provides a rectified input current to the power factor correction system. The control unit is configured to operate the controllable switch.

In another embodiment, the present invention provides a power factor correction comprising two coupled inductors, a forward transformer, four diodes, three capacitors, a switch and a control unit.

Other aspects of the present invention will become apparent by consideration of the detailed description and the accompanying drawings

DETAILED DESCRIPTION

Figure 1:
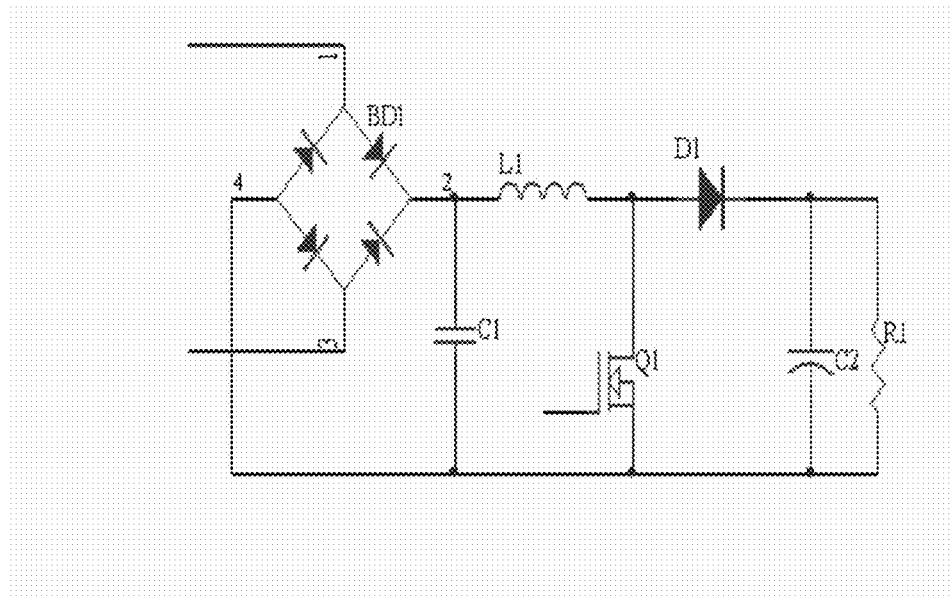
FIG. 1 is a schematic diagram of the prior art.

Before any embodiments of the present invention are explained in detail, it is to be understood that the present invention is not limited in its application to the details of the construction and the arrangements of components set forth in the following description or illustrated in the drawings. The present invention is capable of the other embodiments and of being practiced or of being carried out in various ways.

FIG. 1 illustrates the traditional PFC topology. This boost converter usually operates in discontinous current (DCM) which is well known in the switching converters. In DCM, the output current (which equals the inductor current during time periods in which the switch Q1 is off) drops to zero and remains zero for at leas a short delay time. This definition distinguishes DCM from continuous current mode (CCM) in which the inductor current would not drop to zero during a switching cycle. In this case, when the switch is on, there is large reversed current conducting through the diode D1 and the switch Q1, resulting significant power loss.

Figure 2:
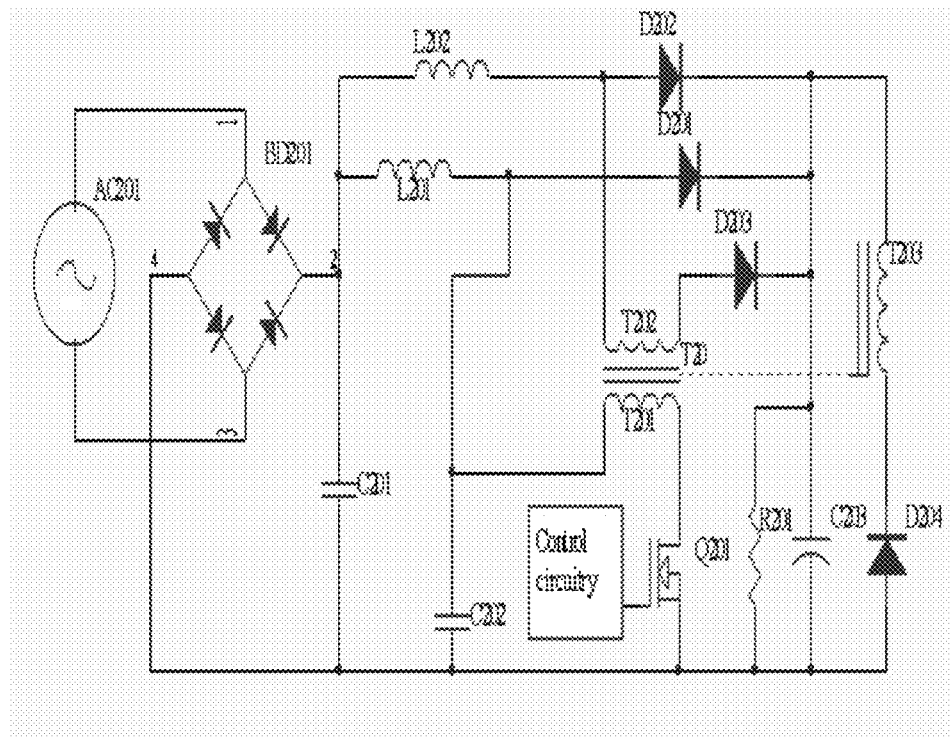
FIG. 2 is a schematic of one embodiment of the present invention.

FIG. 2 illustrates one example of a rectifier circuit that includes a boost PFC system of the present invention. The bridge rectifier BD201 receives current from an AC power source AC 201. The rectifier circuit includes a capacitor C201 that smoothes the ripple current before it is supplied to the boost PFC system. The boost PFC system includes two inductors, a forward transformer, four diodes, two capacitors, a switch, and a control circuit unit. The control circuit unit generates control signal to control the switch according to the input voltage and the output voltage of the boost PFC system.

The configuration of the PFC system is as following:

The forward transformer T20 have three windings: a first winding T201, a second winding T202 and a third winding T203. The first inductor L201, the first winding T201 of the forward transformer T20 and the switch Q201 are connected in series and then is coupled to the outputs of the bridge rectifier BD201 with the inductor L201 to the positive output of the bridge rectifier BD201 and the switch Q201 to the negative output of the bridge rectifier BD201. The anode of the first diode D201 is connected to the first inductor L201. The third capacitor C203 has a positive terminal which is connected to the cathode of the first diode D201, and a negative terminal which is connected to the negative output of the bridge rectifier BD201. The second winding T202 of the forward transformer T20 and the third diode D203 are connected in series and then connected to the second diode D202 in parallel and then connected to the second inductor L202 in series; and then this circuit is coupled between the positive output of the bridge rectifier BD201 and the positive terminal of the third capacitor C203 with the cathodes of the two diode D202, D203 coupled toward the positive terminal of the third capacitor C203. The third winding T203 of the forward transformer T20 and the fourth diode D204 are connected in series then coupled to the third capacitor C203 in parallel with the cathode of the fourth diode D204 toward the positive terminal of the third capacitor C203. The load 8201 is connected to the third capacitor in parallel. The load R201 is a DC to DC converter or a DC to AC converter.

The operation of the PFC system is as following:

When the switch Q201 is on, a current from the positive output of the bridge rectifier BD201 conducts through the first inductor L201, the first winding T201 of the forward transformer T20 and the switch Q201, to the negative output of the bridge rectifier BD201; and at the same time there is an induced voltage in the second winding T202 of the forward transformer T20 and this voltage and the input rectified voltage force a current through the second inductor L202, the second winding T202 of the forward transformer T20 and the third diode D203, to charge the third capacitor C203.

When the switch Q201 is off, there is an induced voltage in the first inductor L201 and the induced voltage in the first inductor and the input rectified voltage force a current through the first inductor L201 and the first diode D201 to charge the third capacitor C203; and at the same time there is an induced voltage in the second inductor L202 and the induced voltage in the second inductor and the input rectified voltage force a current through the second inductor L202 and the second diode D202 to charge the third capacitor C203. The energy stored in the forward transformer T20 is released through the third winding T203 of the forward transformer T20 and the fourth diode D204 to charge the third capacitor C203.

The number of the windings of the third winding T203 of the forward transformer T20 is designed three times more than the number of the windings of the first winding T201 of the forward transformer T20 to reduce the switch Q201 voltage stress.

The second capacitor C202 is used to reduce the switching power loss of the switch Q201. When the switch Q201 is off, the voltage across the switch Q201 is limited by the voltage across the second capacitor C202.

The first winding T201 of the forward transformer T20 is used to prevent large reversed current through the second first diode D201 and the switch Q201. The current through the first inductor L201 and the second inductor L202 is able to be operated in DCM or CCM mode without significant power loss.

Figure 3:
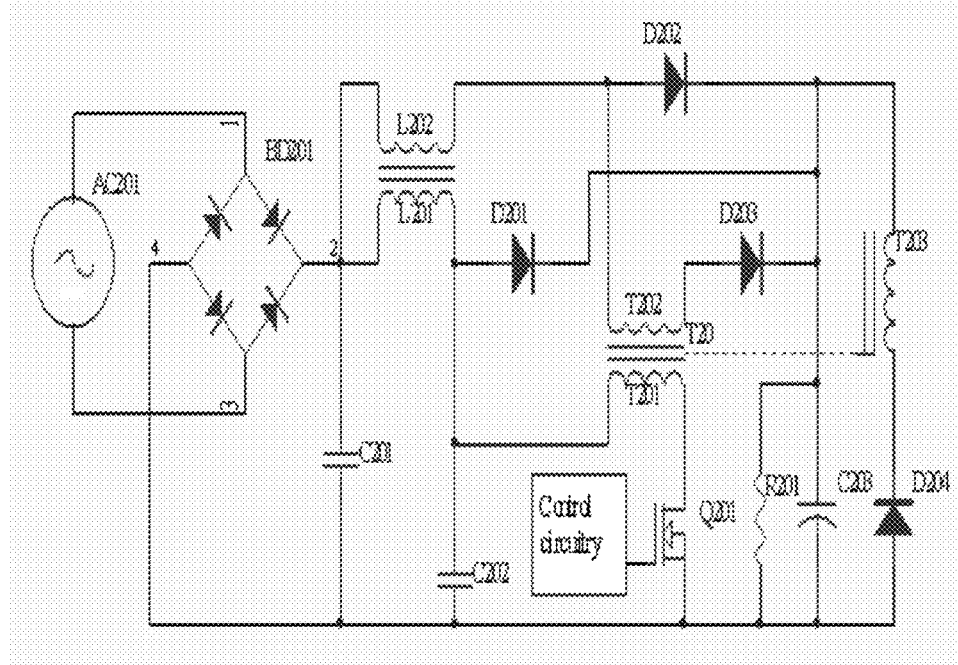
FIG. 3 is a schematic of another embodiment of the present invention.

FIG. 3 illustrates another example of a rectifier circuit that includes boost PFC system of the present invention. In this circuit the first inductor L201 and the second inductor L202 have the same magnetic core.

Figure 4:
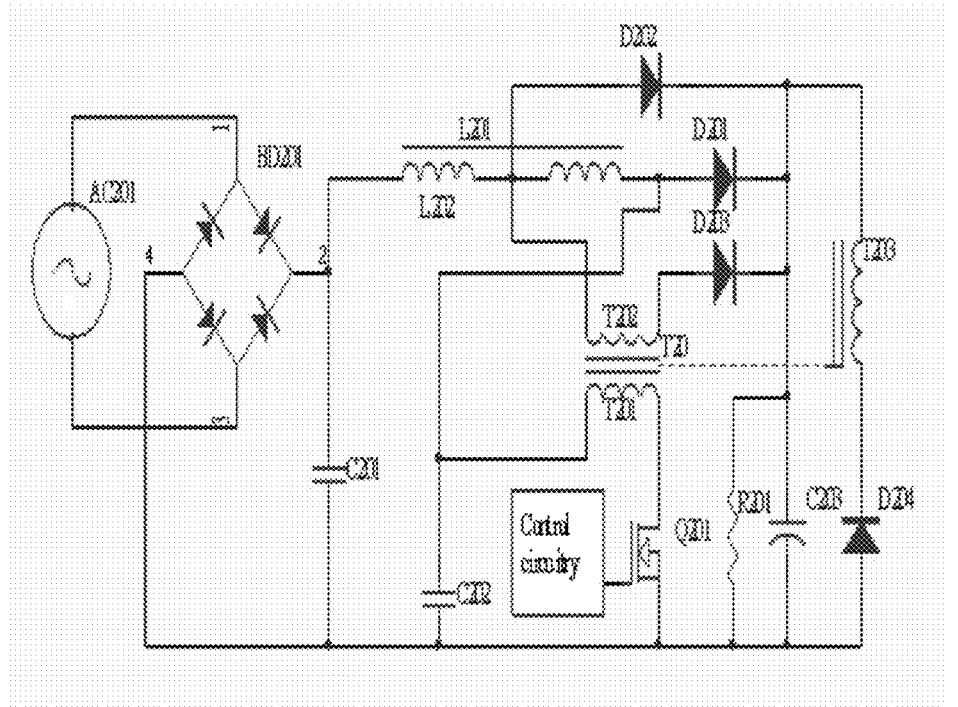
FIG. 4 is a schematic of yet another embodiment of the present invention.

FIG. 4 illustrates yet another example of a rectifier circuit that includes boost PFC system of the present invention. In this circuit the second inductor L202 is part of the first inductor L201. When the inductance value of the second inductor L202 equals to the inductance value of the first inductor L201, there is only one inductor required for this circuit. When the inductance value of the second inductor equals to zero, there is only one inductor required for this circuit.

The present invention provides, among other things, a power factor correction system and methods of the operating the same to reduce power loss. Various features and advantages of the present invention are set forth in the following claims.

What is claimed is:

1. A power factor correction system comprising:
   a bridge rectifier with output terminals and input terminals for receiving an AC power signal;
   a first capacitor coupled to the outputs of the bridge rectifier;
   a second capacitor;
   a third capacitor with a positive terminal and a negative terminal;
   a first inductor with its one terminal connected to the positive output of the bridge rectifier; the first inductor and the second capacitor being connected in series and then being coupled to the output terminals of the bridge rectifier;
   a second inductor;
   a first diode; the first inductor, the first diode and the third capacitor being coupled in series and then being coupled to the output terminals of the bridge rectifier; the cathode of the first diode being connected to the positive terminal of the third capacitor;
   a second diode;
   a third diode;
   a fourth diode;
   a forward transformer with three windings: a first winding, a second winding and a third winding; the second winding of the forward transformer and the third diode being connected in series and then being connected to the second diode in parallel; the second inductor, the second diode and the third capacitor being connected in series and then being coupled to the output terminals of the bridge rectifier; the cathode of the second diode being connected to the positive terminal of the third capacitor; the third winding of the forward transformer and fourth diode being connected in series and then being connected to the third capacitor in parallel;
   a switch with a first terminal, a second terminal and a control terminal; the control terminal being coupled to the control circuit unit; the first inductor, the first winding of the forward transformer and the switch being connected in series and then being coupled to the output terminals of the bridge rectifier; the second terminal of the switch being coupled the negative output terminal of the bridge rectifier.

2. A power factor correction system of claim 1, wherein the first inductor, the first winding of the forward transformer are connected in series; the first inductor is used to draw the input current to the third capacitor; the first winding is used to prevent the large reversed current conducting through the first diode and the switch and is used to transfer energy to the second winding of the forward transformer.

3. A power factor correction system of claim 1, wherein the third winding of the forward transformer and the fourth winding are connected in series and then being coupled to the third capacitor to release the energy stored in the forward transformer and to reduce the switch voltage stress.

4. A power factor correction system of claim 1, wherein the second inductor, the second winding of the forward transformer and the third diode are connected in series and then being coupled between the positive output of the bridge rectifier and the positive terminal of the third capacitor to draw the input current to the third capacitor.

5. A power factor correction system of claim 4, wherein the second inductor is an independent inductor or a coupled inductor of the first inductor or a part of the first inductor.

6. A power factor correction system of claim 5, wherein when the second inductor is a part of the first inductor, the range of the inductance value of the second inductor is from 0 to the inductance value of the first inductor.

* * * * *